UNITED STATES PATENT OFFICE.

FRANCIS H. SMITH, OF BALTIMORE, MARYLAND, ASSIGNOR TO FRANCIS H. SMITH, JR., OF NEW YORK CITY.

IMPROVED PROCESS OF PRESERVING VEGETABLES.

Specification forming part of Letters Patent No. 93,841, dated August 17, 1869.

*To all whom it may concern:*

Be it known that I, FRANCIS H. SMITH, of the city and county of Baltimore, and State of Maryland, have invented a new and Improved Process for Preserving Vegetables; and I do hereby declare that the following is a full, clear, and exact description of the principles and operation of the same.

I take Irish potatoes, sweet potatoes, and onions in the raw state and slice them. I then subject them to the action of steam or hot water from five to fifteen minutes, as the nature of the vegetable under treatment may require. This operation "sets" or coagulates the albumen and starch contained within the vegetable cells, and prevents discoloration. The slices are then transferred to an oven or chamber, in which they are subjected to the action of dry heat until they are thoroughly dried.

Irish potatoes, when so prepared, are semi-translucent, hard, and brittle, appearing like pieces of glue.

Sweet potatoes are also hard and brittle, and covered with a white powder, which is the crystallization of the sugar contained therein.

Onions are shriveled and dried like dried flowers.

Having thus described my invention, what I claim as new, and desire to secure by Letters Patent, is—

1. The process of preparing vegetables, substantially as herein described, and for the purposes specified.
2. The article of prepared potato, when prepared by my improved process, as described herein.
3. The article of prepared sweet potato, when prepared by my improved process, as described herein.
4. The article of prepared onion, when prepared by my improved process, as described herein.

F. H. SMITH.

Witnesses:
    J. SEAVER PAGE,
    JAMES SYMINGTON.